Patented Jan. 3, 1950

2,492,955

UNITED STATES PATENT OFFICE 2,492,955

POLYOXYALKYLENE COMPOUNDS

Seaver Ames Ballard, Orinda, Rupert Clarke Morris, Berkeley, and John L. Van Winkle, San Lorenzo, Calif., assignors to Shell Development Company, San Francisco, Calif., a corporation of Delaware No Drawing. Application August 31, 1946, Serial No. 694,418

6 Claims. (Cl. 260—615)

This invention relates to new and useful lubricating compositions more particularly it relates to lubricating compositions comprising the polymers and copolymers of glycols having more than 5 carbon atoms between the glycollic hydroxyl groups and to novel polymeric materials.

It is well known that lubricants may be formed from certain alkylene oxides having the oxygen joined to adjacent carbon atoms and alkylene glycols having the glycollic hydroxyl radicals on adjacent carbon atoms. Such oxides and glycols may be polymerized to form long-chain polymers of the general configuration

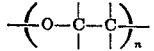

where $n$ is an integer and the four carbon valences in the above unit formula are either hydrogens or organic radicals, preferably either hydrogen atoms or hydrocarbon radicals. Ethylene oxide, propylene oxide, butylene oxide, ethylene glycol, triethylene glycol, and homologs and analogs thereof form polymers of this sort. Polymers having this general configuration, especially polymers of propylene oxide, have found limited utility as lubricants, since they are generally viscous oils having certain lubricating properties.

However, the above polymers have one serious drawback which limits their use as lubricants or for other purposes such as plasticizers in cellulose derivative compositions, etc., namely, the two-carbon unit between the ether linkages in the polymer chain appears to make the polymer extremely sensitive to oxidation. Since the oxidation and degradation products of polymers having the above configuration are volatile at relatively low temperatures, the consumption during engine lubrication, for example, becomes unduly high.

It is an object of this invention to provide a novel method of lubrication. It is another object of this invention to provide non-hydrocarbon lubricants. It is a third object to provide non-mineral oil base lubricants for the replacement of petroleum lubricating oils and greases. It is a further object of this invention to provide a process for the preparation of synthetic lubricants by the polymerization of glycols having more than 5 carbon atoms separating two glycollic hydroxyl groups. Other objects will be obvious from the following description of the present invention.

Now in accordance with this invention it has been found that superior lubricants are formed from glycols having more than 5 carbon atoms separating two glycollic hydroxyl groups. The lubricants comprise having polymer units of the general essential configuration

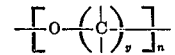

wherein $y$ is an integer greater than 5 and $n$ is an integer. The free valences in the above formula are satisfied with hydrogens or organic radicals.

Still in accordance with the present invention it has been found that glycols having more than 5 carbon atoms separating two glycollic hydroxyls may be copolymerized with alkylene glycols having either 2 or 3 carbon atoms separating the glycollic hydroxyls. The copolymers so prepared have units of the general essential formula

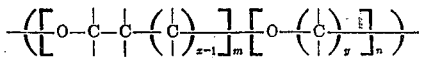

wherein $m$ and $n$ are integers, $x$ is an integer less than 3, and $y$ is an integer greater than 5. The free valences in the above formula are satisfied by such substituents as hydrogens and organic radicals.

The polymers and copolymers described above may be expressed in a single general formula having units of the essential configuration

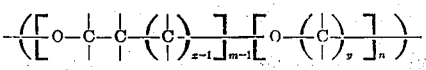

wherein $m$ and $n$ are integers, $x$ is an integer less than 3, and $y$ is an integer greater than 5, the free valences being either hydrogens or organic substituents.

The polymerization of glycols having more than 5 carbon atoms separating the hydroxyl groups is surprising, since tetramethylene glycols and pentamethylene glycols do not polymerize under the conditions and in the presence of the catalysts described in detail hereinafter. The reason for this difference in reaction is obscure, and no theory in its regard can be advanced at this time.

The glycols from which the polymers of the present invention are prepared have the general formula

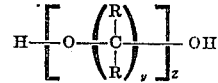

wherein $z$ is an integer, $y$ is an integer greater than 5 and the R's are substituents attached to $y$ carbons are hydrogens or organic radicals. Preferably z is an integer less than 10, and more preferably is an integer from 1 to 4. Actually, when z is more than 1, the glycol is a dimer, trimer, etc., of the corresponding monomeric glycol. The glycols polymerizing most readily are those in which y is an integer from 6 to 20.

Monomeric, unsubstituted glycols falling within the above formula include hexanediol-1,6; heptanediol-1,7; octanediol-1,8; nonanediol-1,9; decanediol-1,10; dodecanediol-1,12; and polymerizable homologs, analogs and derivatives of the same.

The above glycols are those in which all of the R substituents attached to the y carbons are hydrogens. When one or more of the R's are substituents other than hydrogens, they may be hydrocarbon radicals, such as aliphatic, aromatic, or alicyclic hydrocarbon radicals, or radicals containing non-hydrocarbon members, such as hydroxyl, carboxyl, nitro or carbonyl groups, or halogen, sulfur, selenium, tellurium, phosphorus or nitrogen atoms. Preferably, however, any organic radicals attached to the glycol are hydrocarbon radicals. Of these, the aliphatic hydrocarbons are preferred, and the saturated lower aliphatic radicals give the most stable polymers and have the widest utility. Hence, the preferred R's, other than hydrogen, are the lower alkyls, such as methyl, ethyl, propyl, iso-propyl, butyl, sec-butyl, tert-butyl, amyl, iso-amyl, hexyl, etc. groups. Again even when R's other than hydrogen are present, it is preferred that the monomeric glycol contain a preponderance of hydrogen substituent R's. The most reactive glycols are those in which less than 4 R's are other than hydrogen, and the greatest reactivity is possessed by those having 2 or less R's which are organic radicals.

Glycols which fall within the above classification include heptanediol-1,6; octanediol-1,6; nonanediol-1,6; dodecanediol-1,6; decanediol-1,6; octanediol-1,7; nonanediol-1,7; decanediol-1,7; dodecanediol-1,7; nonanediol-1,8; decanediol-1,8; dodecanediol-1,8; decanediol-1,9; dodecanediol-1,9; dodecanediol-1,10; octanediol-2,7; nonanediol-2,7; decanediol-2,7; dodecanediol-2,7; nonanediol-2,8; decanediol-2,8; dodecanediol-2,8; decanediol-2,9; dodecanediol-2,9; 2,3-dimethylhexanediol-1,6; 2,4-dimethylhexanediol-1,6; 2,5-dimethylhexanediol-1,6; 4,4-dimethylhexanediol-1,6; 2-methyl-3-ethylheptanediol-1,7; 2-ethyl-3-methylheptanediol-1,7; 3,3 - diethylheptanediol-1,7; 3,4-diisopropyloctanediol-1,8; etc. and their polymerizable homologs, analogs and derivatives.

The polymers comprising the present invention are polymers of one or more glycols of the above type, or are copolymers of one or more glycols of the above type with alkylene glycols wherein the glycollic hydroxyls are separated by either 2 or 3 carbon atoms. These two latter classes of glycols have the general formula

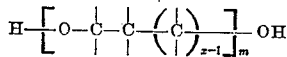

wherein m is an integer and x is an integer less than 3. Thus, when x and m are 1, the general formula becomes that of an ethylene glycol:

wherein the remaining valences are satisfied with hydrogens and/or organic radicals. When m is 1 and x is 2 the general formula becomes that of a trimethylene glycol:

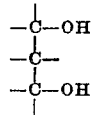

wherein the remaining valences are satisfied with hydrogens and/or organic radicals. When m in the above general formula is 1, the glycols are monomers. However, the polymers, and especially the lower polymers such as the dimers, trimers, tetramers, etc., of the ethylene glycols and trimethylene glycols readily polymerize with glycols having more than 5 carbon atoms separating the glycollic hydroxyls.

Glycols having two carbon atoms separating the glycollic hydroxyls include ethanediol-1,2 (ethylene glycol); propanediol - 1,2; butanediol-1,2; butanediol-2,3; pentanediol-1,2; pentanediol-2,3; hexanediol-1,2; hexanediol-2,3; hexanediol-3,4; heptanediol-1,2; heptanediol-2,3; heptanediol-3,4; and their homologs, analogs and polymerizable derivatives. Lower polymers useful in carrying out the present invention include diethylene glycol, triethylene glycol, tetraethylene glycol, dipropylene glycol, tripropylene glycol, etc.

Glycols having three carbon atoms separating the glycollic hydroxyls are derived from propanediol-1,3(trimethylene glycol) and have the general formula

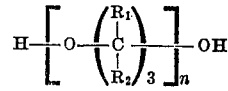

wherein n is an integer and $R_1$ and $R_2$ are hydrogens or organic radicals.

If $R_1$ and/or $R_2$ are not hydrogens, they may be organic radicals such as alkyl, aralkyl, aryl, etc. Preferably, if they are not hydrogens, they are aliphatic radicals, especially saturated lower aliphatic radicals, but may also be groups which contain olefinic or actylenic links. Typical of the trimethylene alkyl substituted glycols are the methylated trimethylene glycols, including 1-methylpropanediol-1,3; 2-methylpropanediol-1,3; 1,1 - dimethylpropanediol - 1,3; 1,2 - dimethylpropanediol - 1,3; 1,3 - dimethylpropanediol - 1,3; 2,2-dimethylpropanediol - 1,3; 1,1,2-trimethylpropanediol - 1,3; 1,2,2 - trimethylpropanediol - 1,3; 1,2,3 - trimethylpropanediol - 1,3; 1,1,2,2 - tetramethylpropanediol - 1,3; 1,1,3,3 - tetramethylpropanediol-1,3; 1,2,3,3-tetramethylpropanediol-1,3, etc.

In place of the methyl groups other alkyl groups may be utilized, such as ethyl, propyl, butyl, amyl, hexyl, heptyl, octyl, nonyl, decyl, etc., radicals, as well as their isomers. Preferably, when alkyl groups are the substituents $R_1$ and $R_2$, they have from 1 to 10 carbon atoms and still more preferably from 1 to 5.

It will be understood that $R_1$ and $R_2$ may be similar or dissimilar groups. Thus when expanding the general formula given hereinbefore to its indicated number of carbon atoms, it then becomes

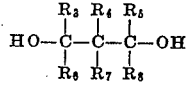

Wherein $R_3$ through $R_8$ are either hydrogens, atoms or similar or dissimilar organic radicals. Those derivatives of trimethylene glycol, which give the most satisfactory polymers for general use have either one or two of the R's as lower alkyl groups. Thus, 2-methylpropanediol-1,3 and 2,2-dimethylpropanediol-1,3 form excellent polymers when treated according to the method of the present invention.

Other lower alkyl substituted trimethylene glycols which polymerize readily are 1-methyl-2-ethylpropanediol-1,3; 2-methyl-2-ethylpropanediol-1,3; 1-methyl-3-ethylpropanediol-1,3; 2-methyl-2-propylpropanediol-1,3; 1-methyl-2-iso-propylpropanediol-1,3; 2-methyl-2-butyl-propanediol-1,3; 2-methyl-3-butylpropanediol-1,3; and the homologs, analogs and derivatives of the same.

Cycloaliphatic radicals may be one or more of the substituents represented by $R_3$ to $R_8$ in the above general formula. Thus, $R_3$ through $R_8$ may be such radicals as cyclohexyl, methylcyclohexyl, dimethylcyclohexyl, ethylcyclohexyl, etc. However, open-chain alkyl substituents give polymers having preferred properties.

The polymers have modified properties if the trimethylene glycol derivative contains other active groups, such as additional hydroxyls, alkyl carboxyls, carbonyls, halogens, sulfur, etc.

The process of the present invention comprises the essential step of heating a glycol having more than 5 carbon atoms between glycollic hydroxyl groups, either alone or with an ethylene glycol, a substituted ethylene glycol, a trimethylene glycol or a substituted trimethylene glycol as defined hereinbefore, in the presence of certain catalysts.

Since the mechanism of the polymerization appears to be one involving dehydration as an intermediate step, dehydration catalysts are employed. These include iodine, inorganic acids such as halogen acids, sulfuric acids and phosphoric acid, and organic acids, particularly sulfonic acids. Specific examples include hydrogen chloride, hydrogen bromide, hydrogen iodide, aromatic sulfonic acids such as para-toluenesulfonic acid, benzenesulfonic acid, acid-acting salts such as alkali methol acid sulfates or phosphates, including sodium bisulfate, aluminum sulfate, potassium acid phosphate, etc.

The catalyst may be employed in solid, liquid or gaseous form, or may be present as an aqueous solution. Hydrogen iodide, for example, is conveniently utilized in the present process as a concentrated aqueous solution, initially containing about 50% water. Others, such as the sulfonic acids, may be added as solids, liquids or in either organic or aqueous solutions.

Dependent upon the nature of the monomer, the identity of the catalyst, the temperature of the polymerization reaction and the polymerization rate desired, the catalyst may be used in ratios with the monomer varying from about 1:500 to 1:10. Preferably, however, the ratio of catalyst is confined to the range from about 1:200 to 1:25; but a ratio of 1:100 gives satisfactory results in most circumstances.

The polymerization reaction may take place in either liquid, solution, emulsion or gaseous phases. Hence, it is possible, and frequently even desirable, to use either liquid or gaseous diluents, especially if active catalysts such as borontrifluoride or aluminum chloride are present. Liquid diluents may perform several functions by their presence, acting as solvents for the monomer and/or the polymer, as solvents for the catalyst, as azeotropic constituents for carrying off water formed during the polymerization, as diluents for the control of polymerization rate, or by their boiling points, as controls for the temperature of the reaction, as one phase of an emulsified reaction mixture, etc. Gaseous diluents are used primarily when the polymerization is carried out in gaseous phase, but also may be injected to carry off the water formed during polymerization, as coolants, etc.

Both gaseous and liquid diluents are preferably substantially inert toward the other components of the reaction mixture in the temperature range encountered prior to, during and after reaction. The most satisfactory diluents are hydrocarbons of either aromatic or aliphatic character, but preferably are saturated aliphatic hydrocarbons. When the diluent is to be used in an aqueous phase polymerization, it is preferably chosen from the group of hydrocarbons boiling between about 125° C. to about 300° C., especially if it is to be used in azeotropic distillation of water during polymerization. Hydrocarbons having boiling points within this range include the dihydronaphthalene; cycloheptane, the decanes, including 2-methyl nonane and 2,6-dimethyloctane, the octanes, including 2,2,3-trimethylpentane and 2-methyl-3-ethylpentane, the nonanes, such as 2-methyloctane, 2,4-dimethylheptane, 4-ethyl-heptane, the dodecanes such as dihexyl or 2,4,5,7-tetramethyloctane, etc.

When the polymerization is carried out in gaseous phase, the diluent may be a lower hydrocarbon such as methane, ethane, propane, butane, etc., which act as regulators or diluents for the reaction, but which can be stripped from the product with facility, subsequent to the polymerization.

The proportion of diluent is not a critical factor in carrying out the process of the present invention. However, it is a preferred practice to keep the reaction mixture as concentrated as possible consistent with maintaining homogeneity, rate of polymerization, etc. Ordinarily, when a diluent is used for a liquid phase polymerization the initial proportion of diluent to glycol is from about 1:1 to about 20:1, but preferably is initially from about 2:1 to about 5:1. When the temperature of the reaction is substantially below the boiling point of the diluent, this ratio will remain unchanged throughout the reaction. If, however, the conditions are such that water formed by dehydration of the glycols during polymerization distills azeotropically with part of the diluent, it is a preferred practice to arrange a return inlet so that the diluent passing over in the azeotrope may be replaced in or near the polymerization zone, so as to maintain a constant diluent: glycol ratio.

Other ingredients may be included in the polymerization mixture, or may be added from time to time during the polymerization. For example, the polymerization may be carried out in a closed system, such as an autoclave. In such a case, the water formed in the polymerization may be effectively removed by the presence of dehydrating agents which will combine with or absorb the water as it is formed. Inert gases such as nitrogen may be added to protect the hot polymerization mass from oxidation. Reactants, such as alcohols, may be present for the purpose of converting the hydroxyl radicals normally present on both ends of the polymer chains to other functional groups, as more particularly set forth hereinafter.

The temperature at which the polymerization is conducted may vary within a relatively wide range; but, unless said temperature is substantially above about 150° C. only a negligible amount of polymerization occurs, at least within a reasonable reaction period. If the reaction temperature is substantially above about 300° C. decomposition of the monomeric glycols and of the polymers takes place to such an extent that undue losses occur and the product requires extensive purification. The preferred polymerization temperature range is from about 170 to 225° C., with the optimum range being from about 175 to about 200° C. It is a preferred practice to conduct the polymerization at temperatures somewhat below the point at which the glycols will commence distilling, but, if higher temperatures are employed, the apparatus may be arranged so as to return the distilled glycols to or near the polymerization zone.

When the polymerization is carried out by assembling all of the reactants in a vessel and heating with continuous or intermittent distillation of water, the reaction time required to obtain products having molecular weights of about 200 or more is at least about 10 hours, and usually is about 24 hours or even longer. Under a given set of conditions, the molecular weight of the polymer varies directly with the amount of water formed, since a molecule of water is formed for every additional monomeric link added to the polymer chain. Consequently, the average molecular weight of the polymeric product can be readily calculated by the amount of water which has distilled out of the polymerization zone.

Following the polymerization period, the product is usually purified. The first step in purification is the removal of the catalyst. If this is a solid, suspended in the liquid polymer or a solution of the polymer, a simple filtration is all that is required. When the calatlyst is in solution other methods must be employed. For example, when sulfonic acids are the catalysts used, a preferred means for their removal from the polymer comprises dissolving or thinning the polymer with an organic solvent such as benzene, washing with concentrated caustic to convert the acid to the sodium salt, and subsequently extracting with water to remove the sodium salts of the acids and any remaining traces of caustic. Alternatively the catalyst may be removed by selective adsorption, an activated carbon or fuller's earth or by treating in a solvent with an acid-base exchange resin.

After removal of the catalyst, the product may be dehydrated in order to remove the last traces of water formed during polymerization and any water remaining from catalyst extraction operations. Water may be removed by the use of dehydrating agents, or by distillation, preferably under subatmospheric pressure. If this latter method is employed, any solvents present and any monomeric glycols may be recycled in a continuous process or may be removed at the same time. Consequently, at the end of these operations there remains the polymerized glycol, free of solvents, water and catalyst.

One phenomenon peculiar to the polymerization of the above glycols is the production of color bodies which lower the quality of the product for some purposes. These color bodies are not soluble in the ordinary extraction media, such as organic solvents and hydrocarbon fractions. Furthermore, the removal of the color by means known to the art fails, when commonly known oxidizing agents, such as permanganate, peroxide are employed as bleaching agents. Other ordinary bleaching procedures heretofore utilized such as treatments with various activated carbons, activated aluminas, silica gels, or extraction with steam or toluene fail to improve the color of the glycol polymers. All of these methods and agents readily decolorize glycerine, for example, but since they fail to improve the color of the subject polymers it is assumed that the color bodies are of a character not encountered heretofore.

However, in accordance with one phase of this invention, it has been found that a major portion of the color bodies may be removed by a combination treatment, comprising initially percolating the dehydrated polymer through fuller's earth, or by heating at 50° to 150° C. with a mixture of fuller's earth and calcium oxide, and subsequently subjecting it to hydrogenation. By this combination treatment polymers of the glycols are obtained having a light yellow color, as compared with the dark brown or black masses initially obtained by the polymerization described.

Percolation through fuller's earth is preferably carried out in an inert solvent, suitably a hydrocarbon such as benzene, toluene xylene, etc. The percolation is preferably carried out at room temperature or below, but may be conducted at elevated temperatures, as long as the temperature and pressure adjustments are such as to prevent boiling of the solvent and consequent deposition of the polymer in the percolation tower. This percolation treatment results in the production of polymers having improved colors satisfactory for many purposes, in which case all that remains to be done is to flash off the solvent in order to recover the polymer.

On the other hand, polymers having the least color can be obtained only by following the percolation with hydrogenation. Neither percolation alone, or hydrogenation alone, or any of the ordinary decolorizing or bleaching procedures results in the formation of light colored glycol polymers such as those obtained by treatment with fuller's earth followed by hydrogenation.

In carrying out the percolation through fuller's earth, oxygen-containing solvents such as acetone methyl alcohol and dioxane are relatively ineffective for aiding in the removal of color from the subject polymers. The color removal appears to be specific in that hydrocarbon solvents, and especially aromatic hydrocarbon solvents are required, benzene and toluene giving the best results.

The hydrogenation step is essential for the reduction of color-sensitive functional groups, supposedly carbonylic in character. Raney nickel, nickel sulfide, copper, palladium, platinum and other catalysts suitable for the reduction of carbonyls may be used, although Raney nickel is preferred. Temperatures employed vary from about 100 to about 275° C., and hydrogen pressures from about 500 to about 3000 pounds per square inch are utilized. Subsequent to hydrogenation, the catalyst may be removed from the product, e. g. by super-centrifuging or filtration, and any solvents present may be flashed off to yield the light yellow polymer or copolymer of the subject glycols.

The polymers formed as described hereinbefore have hydroxyl groups on both ends of each polymer chain. These hydroxyls may be acted upon by the usual methods with such materials as etherifying or esterifying agents in order to obtain products having altered properties, such as solubility or improved action as lubricants, plasticizers, etc.

Various etherifying agents may be used for etherifying the terminal hydroxyls. These include alkyl halides such as methyl iodide, methyl bromide, ethyl chloride, propyl iodide; aralkyl halides such as benzyl chloride and methylbenzyl chloride; hydroxyalkyl chlorides such as hydroxyethyl chloride; carboxyalkylating agents such as sodium monochloracetate; and alkenyl halides such as allyl chloride. Ordinarily, the etherification is carried out in strongly basic environments; sodium hydroxide, liquid ammonia and quaternary ammonium bases and salts being the usual basic substances present.

Esterification of the terminal hydroxyls may be accomplished with various inorganic groups such as nitrates, phosphates or sulfates. However, preferred esterifying agents are the organic acids, anhydrides or acid chlorides, and especially fatty acid anhydrides and their chlorides, including for example formic, acetic, propionic, butyric, hexoic, 2-ethylhexoic, and higher fatty acids such as lauric, stearic, myristic, palmitic and capric acids. Usually, the esters are formed by treatment of the hydroxylated polymer with the anhydride of the acid in the presence of a catalyst such as sulfuric or phosphoric acid. The saturated fatty acids form the most stable esters with the glycol polymers.

At times it is preferable to allow only partial etherification, thus forming half-esters or half-ethers instead of the di-ethers or di-esters theoretically possible. For other purposes the end-group hydroxyls may not only be partially or completely esterified or etherified, but also may be so treated as to result in the formation of mixed ethers, mixed esters or ether-esters.

Etherification or esterification of the end-groups may take place simultaneously with or subsequent to polymerization, and may be effected prior to or subsequent to the decolorizing and purifying processes described hereinbefore. Preferably, the end-group modification is carried out immediately after polymerization and before purification or decolorizing, but a secondary preferred time for modification is during the polymerization step itself.

When employing this last alternative, the exact mechanism by which substitution of the end-groups occurs is obscure. However, it has been discovered, in accordance with this invention, that by using an active modifying agent, such as an alcohol, as the diluent during the polymerization reaction occurs to give polymers having at least one substituted end group, such as an ether group or ester group. For example, if alcohols such as n-octyl alcohol, n-decyl alcohol, n-dodecyl alcohol, etc., or their homologs, analogs or isomers, are used as diluents during the polymerization, the corresponding ethers of the polymers are formed. Since this provides a convenient method for modifying the properties of the polymer, it is preferred that the alcoholic diluent, or other modifying agent, have from about 6 to about 20 carbon atoms. The reactive diluent may be the only diluent present, or may be mixed with one or more inert diluents.

The polymers and copolymers of the present invention have units of the general formula

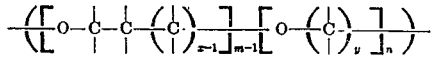

wherein $m$ and $n$ are integers, $x$ is an integer less than 3 and $y$ is an integer greater than 5, the unoccupied valences in the above general formula being satisfied with hydrogen atoms or organic radicals. This general formula includes the polymers of hexamethylene glycol and other glycols having more than 5 carbon atoms between the glycollic hydroxyls, as well as the copolymers of such glycols in which the hydroxyl groups are separated by a chain of 2 or 3 carbon atoms.

Thus, when decamethylene glycol is the monomer, the polymer derived therefrom has the formula

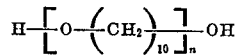

wherein $n$ is an integer. If the end-group hydroxyls are etherified or esterified, or otherwise treated, the polymer or decamethylene glycol has the general formula

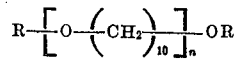

wherein $n$ is an integer and R is hydrogen, alkyl, acyl, etc.

The products of the present invention vary from thin liquids to viscous oils, and, if the molecular weight is great enough, products which are gels or low melting wax-like solids at room temperature are formed. The glycol polymers may be of any molecular weight dependent at least in part upon the extent to which the intermediate glycollic dehydration is carried. Polymers having molecular weights from about 100 to about 10,000 are readily prepared, but those having molecular weights between about 200 and 1500 are preferred, since they have properties of viscosity and solubility which give them extensive utility.

Polymers having molecular weights below about 200 are generally water-soluble, or at least swell in water. Those having higher molecular weights above about 200 are soluble in the usual organic solvents such as aromatic hydrocarbons, esters, ethers, and alcohols. The solubility of the polymer varies with (a) molecular weight; (b) identity of the monomer; and (c) end-group modification. If, however, the polymer, and especially those having molecular weights below about 1100, have end-groups of substantial size, such as a n-decyl ether group, the properties such as solubility, etc., may be substantially modified.

The subject polymers are oils or wax-like solids, and have properties making them useful for such purposes as oils or greases. They may be used in combination with soaps, anti-oxidants, anti-corrosion agents, extreme pressure agents and other additives, thus forming a series of compositions having highly desirable properties as superior lubricants. Due to their high viscosity index and resistance to oxidation they are superior lubricants where a wide range of operating conditions are encountered, or where the lubricant is subjected to oxidation. The polymers and copolymers of the present invention may be used to modify and improve other polymerizable materials.

Having described the characteristics, preparation, properties and uses of the subject polymers, examples are presented illustrating specific embodiments of the invention, especially of the polymerization process and the polymers so formed:

EXAMPLE I

*Polymerized hexamethylene glycol*

Two hundred fifty parts hexamethylene glycol and 10 parts hydrogen iodide (50% aqueous solution) were heated in a reaction vessel fitted with a still head, allowing water to distill without reflux. After heating for 4 hours at 150–200° C., 26 parts of water had distilled. The reaction mixture was washed with water and dried at 100° C. under 5 mm. Hg pressure. The polymer formed by this reaction has the following properties:

| | |
|---|---|
| Molecular weight | 350 |
| Centistokes viscosity, 100° F. | 97.3 |
| Centistokes viscosity, 210° F. | 11.57 |
| Viscosity index | 113 |
| Melting point, °C. | 25–30 |

Insoluble in water, isopentane and hydrol.

EXAMPLE II

*Polymerized decamethylene glycol*

240 parts decamethylene glycol and 30 parts hydrogen iodide (50% aqueous solution) were heated at 170°–200° C. for 3 hours, 18 parts water being distilled without reflux out of the polymerization mass during that time. The polymer was washed with water and dehydrated by heating at 100° C. under 5 mm. Hg pressure. The polymer formed under these conditions had the following properties:

| | |
|---|---|
| Molecular weight | 836 |
| Centistokes viscosity, 100° F. | 310 |
| Centistokes viscosity, 210° F. | 37.2 |
| Viscosity index | 132 |
| Melting point, °C. | 52–55 |

EXAMPLE III

*Copolymerization of trimethylene glycol and hexamethylene glycol*

Eight hundred parts trimethylene glycol, 200 parts hexamethylene glycol, 15 parts hydrogen iodide (50% aqueous solution), were heated for 10 hours, at 170°–200° C. The water of polymerization distilled continuously. The product was washed with water and dried at 100° C. under 3 mm. Hg pressure. The copolymer formed under these conditions had the following properties:

| | |
|---|---|
| Molecular weight | 549 |
| Centistoke viscosity, 100° F. | 100.7 |
| Centistoke viscosity, 210° F. | 14.0 |
| Viscosity index | 131 |
| Color, Gardiner | 13 |
| Pour point, °F. | −60 |

We claim as our invention:

1. A new composition of matter comprising a mixture of copolymers having the general formula

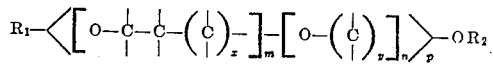

wherein $x$ is an integer less than 2, $y$ is an integer from 6 to 20, the dangling valences of each monomeric unit are satisfied by substituents of the group consisting of hydrogen atoms and saturated hydrocarbon radicals having 1 to 6 carbon atoms, $R_1$ and $R_2$ are independently selected from the group consisting of hydrogen atoms, alkyl radicals and carboxylic acid acyl radicals and $m$, $n$ and $p$ are integers selected to give the mixture of copolymers an average molecular weight between 200 and 1500.

2. A new composition of matter according to claim 1 in which the unit

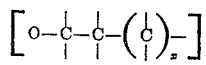

has the configuration

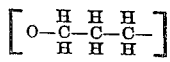

3. A new composition of matter according to claim 1 wherein the unit

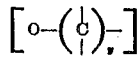

has the configuration

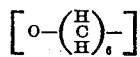

4. A new composition of matter according to claim 1 wherein the unit

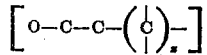

has the configuration

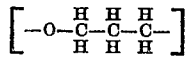

and the unit

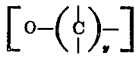

has the configuration

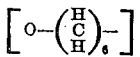

5. A new composition of matter comprising a mixture of copolymers having the general formula

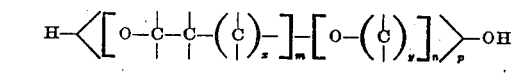

wherein $x$ is an integer less than 2, $y$ is an integer from 6 to 20, the dangling valences are satisfied by substituents selected from the group consisting of hydrogen atoms and saturated hydrocarbon radicals having 1 to 6 carbon atoms, and $m$, $n$ and $p$ are integers selected to give the mixture of copolymers an average molecular weight between 200 and 1500.

6. A new composition of matter comprising a mixture of copolymers having the general formula

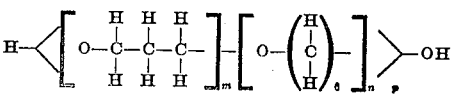

wherein $m$, $n$ and $p$ are integers selected to give the mixture of copolymers an average molecular weight between 200 and 1500.

SEAVER AMES BALLARD.
RUPERT CLARKE MORRIS.
JOHN L. VAN WINKLE.

REFERENCES CITED

The following references are of record in the file of this patent:

UNITED STATES PATENTS

| Number | Name | Date |
|---|---|---|
| 1,984,421 | Muench et al. | Dec. 18, 1934 |
| 2,071,250 | Carothers | Feb. 18, 1937 |
| 2,089,569 | Orthner | Aug. 10, 1937 |
| 2,146,323 | Zellhoefer | Feb. 7, 1939 |
| 2,146,324 | Zellhoefer | Feb. 7, 1939 |
| 2,258,892 | Harris | Oct. 14, 1941 |
| 2,383,915 | Morgan | Aug. 28, 1945 |
| 2,425,755 | Roberts | Aug. 19, 1947 |
| 2,425,845 | Toussaint | Aug. 19, 1947 |
| 2,434,978 | Zisman | Jan. 27, 1948 |

FOREIGN PATENTS

| Number | Country | Date |
|---|---|---|
| 425,728 | Great Britain | Mar. 20, 1935 |

Patented Jan. 3, 1950

2,492,986

UNITED STATES PATENT OFFICE 2,492,986

COMPOSITION FOR PRODUCING CARBON DIOXIDE FROM HYDROGEN AND CARBON CONTAINING COMPOUNDS, AND THE PROCESS FOR PRODUCING THE SAME

Clifford Hach, Clifton, N. J., assignor to Kidde Manufacturing Co., Inc., Bloomfield, N. J., a corporation of Delaware No Drawing. Application January 4, 1946, Serial No. 639,145

3 Claims. (Cl. 252—186)

This invention relates to a product composed of a mixture of oxidizing material, catalytic material and binding material and to a process of preparing the product.

An object of the present invention is to provide an improved porous product composed of oxidizing and catalytic materials.

Another object is to provide a product of the foregoing character particularly adapted for use in a process for directly producing high yields of substantially pure carbon dioxide from hydrogen and carbon containing compounds.

Another object is to provide a product of the foregoing character adapted to be prepared in a simple, inexpensive manner from materials readily available at a low cost.

Another object is to provide a product of the foregoing character which readily gives up its oxygen and is readily regenerated or reactivated.

Another object is to provide a product of the foregoing character which may be used over again a great number of times.

Another object is to provide a product of the foregoing character which is heat resistant, and will not melt or shrink on heating to the melting point of copper and slightly above.

A further object is to provide an improved method of preparing a product of the foregoing character.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, it has been found that the foregoing objects may be accomplished by a product comprising a mixture of copper oxide, aluminum oxide and iron oxide, wherein the copper oxide serves as the oxidizing material in the preparation of carbon dioxide from hydrogen and carbon containing compounds, the iron oxide serves as a catalytic material, and the aluminum oxide serves both as a catalytic and binding material. The improved process provides for the preparation of the product in the form of porous particles of substantially uniform size having a maximum effective surface area adapted to be contacted by hydrogen and carbon containing compounds to catalytically oxidize the compounds to produce carbon dioxide. Also, by reason of such surface area the reacting material is readily regenerated when contacted by an oxygen containing gas.

The materials preferred in preparing the product in accordance with the present invention are powdered cupric oxide, CuO; Alundum cement, a refractive material which consists essentially of fused aluminum oxide, $Al_2O_3$; and ferric oxide, $Fe_2O_3$.

The product in accordance with the invention comprises essentially:

Cupric oxide, approximately 45 to 50 parts by weight
Alundum cement, approximately 45 to 50 parts by weight
Ferric oxide, approximately 2 to 10 parts by weight It will be understood that the proportions of the foregoing materials may be varied to some extent within the above limits without sacrificing the advantages of the present invention.

The process of preparing the product of the present invention is illustrated by the following example:

Example

Fifty parts by weight of powdered cupric oxide, forty-five parts by weight of powdered Alundum cement, and five parts by weight of ferric oxide were mixed in dry form. Sufficient water was added to the mixture of powdered oxides to make a stiff paste and this paste was worked to reduce agglomerates and to insure uniform wetting of the powder particles to provide a substantially homogeneous mass.

The paste was then extruded through a 12 mesh screen to produce spaghetti-like formations of substantially uniform diameter and these formations were dried at a temperature of about 100° C. to drive off the water. The dried mass was then transferred to a crucible, and was fired at a temperature of about 1000° C. for a period of between about one-half and one hour, whereby the material was sintered to produce a substantially porous mass.

After sintering, the mass of porous material was disintegrated by crushing the same to produce porous particles of a substantially uniform predetermined size adapted to pass through a quarter inch mesh screen. The fines were removed with a 20 mesh screen.

The porous product prepared by the foregoing process was used in directly producing carbon dioxide by the catalytical oxidation of hydrogen and carbon containing compounds. The carbon dioxide produced was substantially pure and high yields of carbon dioxide were obtained. The cupric oxide gave up its oxygen in a desired manner and after being reduced to a predetermined degree could be readily reactivated by passing air thereover. The catalytic material, aluminum and ferric oxides, did not appear to become poisoned during the reaction cycle and appeared to be in its initial state after reactivation of the mixture. The physical characteristics of the mixture did not change materially. Also, the mixture did not disintegrate and appeared to be heat resistant. The copper oxide, copper or partly reduced copper oxide did not form molten agglomerations at temperatures slightly higher than the melting point of copper and copper oxide. The product was used over again eighty times before replacement thereof was believed to be advisable.

In place of or in addition to the ferric oxide there may be employed one or more heavy metal oxides of the group consisting of cobalto cobaltic oxide ($Co_3O_4$), manganic oxide ($Mn_2O_3$), and nickel oxide (NiO).

Also, in place of or in addition to the aluminum oxide, there may be employed one or more oxides of the group consisting of silicon oxide ($SiO_2$), magnesium oxide (MgO), and zirconium oxide ($ZrO_2$).

From the foregoing description it will be seen that the present invention provides an improved mixture of oxidizing material and catalytic material and a simple process of preparing the same. By extruding the paste prior to drying and sintering, the size of the particles can be accurately controlled.

The mixture is particularly adapted for use in the direct preparation of carbon dioxide from hydrogen and carbon containing compounds by a process such as described in co-pending application Serial No. 639,143, filed January 4, 1946.

It will be understood that the details and examples hereinbefore set forth are illustrative only and that the invention as broadly described and claimed is in no way intended to be limited thereby.

It is also to be understood that the following claims are intended to cover all the generic and specific features of the invention herein described, and all statements of the scope of the invention which, as a matter of language, might be said to fall therebetween.

I claim:

1. A product adapted for use in a process for directly producing carbon dioxide from hydrogen and carbon containing compounds, said product consisting of about 45 to 50 parts by weight of cupric oxide, about 45 to 50 parts by weight of a material selected from the group consisting of aluminum oxide, magnesium oxide, silicon oxide and zirconium oxide, and about 2 to 10 parts by weight of a material selected from the group consisting of ferric oxide, cobalto cobaltic oxide, manganic oxide and nickel oxide.

2. A product adapted for use in a process for directly producing carbon dioxide from hydrogen and carbon containing compounds, said product consisting of porous particles of substantially uniform size formed of a mixture of about 45 to 50 parts by weight of cupric oxide, about 45 to 50 parts by weight of a material selected from the group consisting of aluminum oxide, magnesium oxide, silicon oxide and zirconium oxide, and about 2 to 10 parts by weight of a material selected from the group consisting of ferric oxide, cobalto cobaltic oxide, manganic oxide and nickel oxide.

3. The method of preparing a product of the class described, comprising mixing about 45 to 50 parts by weight of cupric oxide between, about 45 and 50 parts by weight of a material selected from the group consisting of aluminum oxide, magnesium oxide, silicon oxide and zirconium oxide, about 2 to 10 parts by weight of a material selected from the group consisting of ferric oxide, cobalto cobaltic oxide, manganic oxide and nickel oxide, and sufficient water to form a stiff paste, extruding the paste through a screen to form spaghetti-like formations of a predetermined diameter, sintering the paste formations at a temperature of about 1000° C. for a period of between about one-half to about one hour to form a hard rigid material which is porous, and disintegrating the material to form particles of the product having a predetermined size.

CLIFFORD HACH.

REFERENCES CITED

The following references are of record in the file of this patent:

UNITED STATES PATENTS

| Number | Name | Date |
|---|---|---|
| 1,939,708 | Larson | Dec. 19, 1933 |
| 1,970,695 | Freyermuth | Aug. 21, 1934 |
| 2,010,427 | Eversole | Aug. 6, 1935 |
| 2,106,597 | Ferguson | Jan. 25, 1938 |
| 2,143,367 | Balz et al. | Jan. 10, 1939 |
| 2,180,672 | Frey | Nov. 21, 1939 |
| 2,242,627 | Strickland | May 20, 1941 |

OTHER REFERENCES

Mellor: Comprehensive Treatise on Inorganic and Theoretical Chemistry, vol. 3, page 137 (1928).